(12) United States Patent
Bestaoui-Spurr et al.

(10) Patent No.: US 9,637,671 B2
(45) Date of Patent: May 2, 2017

(54) METHOD OF SUPPRESSING THE GENERATION OF DUST FROM SAND

(71) Applicant: Baker Hughes Incorporated, Houston, TX (US)

(72) Inventors: Naima Bestaoui-Spurr, The Woodlands, TX (US); Mark Alan Vorderbruggen, Spring, TX (US); Harold Dean Brannon, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/875,326

(22) Filed: Oct. 5, 2015

(65) Prior Publication Data
US 2016/0024360 A1    Jan. 28, 2016

Related U.S. Application Data

(63) Continuation-in-part of application No. 14/575,737, filed on Dec. 18, 2014, which is a
(Continued)

(51) Int. Cl.
| | |
|---|---|
| *B05D 5/00* | (2006.01) |
| *B05D 1/02* | (2006.01) |
| *C04B 14/06* | (2006.01) |
| *C09K 3/22* | (2006.01) |
| *C08K 3/36* | (2006.01) |
| *C08K 9/04* | (2006.01) |
| *C04B 20/10* | (2006.01) |
| *C09K 8/575* | (2006.01) |

(Continued)

(52) U.S. Cl.
CPC ............ *C09K 3/22* (2013.01); *C04B 20/1033* (2013.01); *C09C 1/3072* (2013.01); *C09K 8/5751* (2013.01); *C09K 8/805* (2013.01); *B82Y 30/00* (2013.01); *C04B 2103/0075* (2013.01); *C09K 2208/10* (2013.01); *Y10T 428/2993* (2015.01)

(58) Field of Classification Search
None
See application file for complete search history.

(56) References Cited

U.S. PATENT DOCUMENTS

| | | |
|---|---|---|
| 3,682,249 A | 8/1972 | Fischer et al. |
| 4,925,247 A | 5/1990 | Hjelmstad |
| | (Continued) | |

OTHER PUBLICATIONS

"Occupational Health Program for Exposure to Crystalline Silica in the Industrial Sand Industry," 2nd edition, published by the National Industrial Sand Association, Washington, DC, Apr. 2010.*
(Continued)

*Primary Examiner* — Vu A Nguyen
(74) *Attorney, Agent, or Firm* — John Wilson Jones; Jones Delflache LLP

(57) ABSTRACT

A composite is characterized by particulates of sand wherein at least a portion of the surface of the particulates is coated with a polycationic polymer. The presence of the polycationic polymer on the surface of the particulates reduces the amount of dust generated during handling and use of the sand. The polycationic polymer further reduces the amount of dust generated during transport of the sand as well during manufacture, treatment or processing of the sand.

31 Claims, 7 Drawing Sheets

Related U.S. Application Data continuation-in-part of application No. 14/525,571, filed on Oct. 28, 2014, which is a continuation-in-part of application No. 13/784,586, filed on Mar. 4, 2013, now Pat. No. 9,168,565, which is a continuation-in-part of application No. 13/283,405, filed on Oct. 27, 2011, now Pat. No. 9,328,590.

(51) Int. Cl.

| | |
|---|---|
| *C09K 8/80* | (2006.01) |
| *C09C 1/30* | (2006.01) |
| *B82Y 30/00* | (2011.01) |
| *C04B 103/00* | (2006.01) |

(56) References Cited

U.S. PATENT DOCUMENTS

| | | | |
|---|---|---|---|
| 6,309,431 | B1 | 10/2001 | Becker et al. |
| 6,364,018 | B1 | 4/2002 | Brannon et al. |
| 6,896,926 | B2 | 5/2005 | Qiu et al. |
| 7,032,664 | B2 | 4/2006 | Lord et al. |
| 7,115,546 | B2 | 10/2006 | Qu et al. |
| 7,144,844 | B2 | 12/2006 | Qu et al. |
| 7,493,955 | B2 | 2/2009 | Gupta et al. |
| 7,507,469 | B2 | 3/2009 | Mao et al. |
| 7,931,089 | B2 | 4/2011 | Miller et al. |
| 9,168,565 | B2 | 10/2015 | Vorderbruggen et al. |
| 9,328,590 | B2 | 5/2016 | Vorderbruggen et al. |
| 2004/0110877 | A1 | 6/2004 | Becker |
| 2007/0114030 | A1 | 5/2007 | Todd et al. |
| 2008/0011477 | A1 | 1/2008 | Rediger et al. |
| 2009/0189113 | A1* | 7/2009 | Lamperd .................. C09K 3/22 252/88.1 |
| 2010/0019456 | A1 | 1/2010 | Gerrard |
| 2011/0077176 | A1 | 3/2011 | Smith et al. |
| 2011/0105367 | A1 | 5/2011 | Bicerano et al. |
| 2011/0118155 | A1 | 5/2011 | Pisklak et al. |
| 2014/0060832 | A1 | 3/2014 | Mahoney et al. |
| 2015/0047848 | A1 | 2/2015 | Bestaoui-Spurr et al. |
| 2015/0104647 | A1 | 4/2015 | Bestaoui-Spurr et al. |

OTHER PUBLICATIONS

Silica Sand Mining in Wisconsin, published by Wisconsin Department of Natural Resources in Jan. 2012.*

Lu et al., "Magnetic Switch of Permeability for Polyelectrolyte Microcapsules Embedded with Co@Au Nanoparticles", American Chemical Society, Langmuir 2005, 21, 2042-2050.

Yang, Y.-J et al.; "Mesoporous Silica Nanotubes Coated with Multilayered Polyelectrolytes for pH-Controlled Drug Release"; Acta Biomaterialia 2010, 6(8) 3092-3100.

Sukhorukov, G.B. et al; "Layer-by-Layer Self Assembly of Polyelectrolytes on Colloidal Particles"; Colloids and Surfaces A; Physicochemical and Engineering Aspects; 1988; 137(-13), 253-266.

N. Pargaonkar et al.; "Controlled Release of Dexamethasone from Microcapsules Produced by Polyelectrolyte Layer-by-Layer Nanoassembly"; Pharmaceutical Research, 2005, 22, 826-835.

* cited by examiner

METHOD OF SUPPRESSING THE GENERATION OF DUST FROM SAND

This application is a continuation-in-part application of U.S. patent application Ser. No. 14/575,737, filed on Dec. 18, 2014, which is a continuation-in-part of U.S. patent application Ser. No. 14/525,571, filed on Oct. 28, 2014, which is a continuation-in-part of U.S. patent application Ser. No. 13/784,586, filed on Mar. 4, 2013, which is a continuation-in-part of U.S. patent application Ser. No. 13/283,405, filed on Oct. 27, 2011, all of which are herein incorporated by reference.

FIELD OF THE DISCLOSURE

The present disclosure relates to composites of sand wherein at least a portion of the surface of the sand is coated with a polyionic polymer. The disclosure further relates to methods of reducing or inhibiting the generation of dust from sand by coating onto at least a portion of the surface of the sand a polyionic polymer.

BACKGROUND OF THE DISCLOSURE

Crystalline silica, the basic component of sand, consists of respirable size particles and has been classified as a human lung carcinogen. The seriousness of the health hazards associated with silica exposure is evident from the increasing number of fatalities and disabling illnesses attributable to the ingestion of sand dust. Breathing crystalline silica dust has been known to cause silicosis wherein respirable silica dust enters the lungs and causes formation of scar tissues, thus reducing the ability of the lungs to take in oxygen. There is no cure for silicosis.

The concern of the harmful effects of sand dust is acute in the construction industry. Construction workers use blasting sand as an abrasive to clean metal and concrete surfaces such as during the removal of paint and rust. In addition, construction workers use sand in stucco, plasters, roofing, bricks, grout and paints for color, strength and weatherability. The generation of harmful sand dust is also a concern to workers in other industries. For instance, foundry workers use sand to create cores and molds such as those used in the casting of iron, steel, copper and aluminum products. Manufacturers and formulators use sand as a component of a mixture. Pool maintenance personnel use sand as a filter. Further, sand is used in recreational areas, including golf courses, sport fields and playgrounds, etc.

The release of dust particulates has also presented a concern during treatment operations of wells. For instance, sand is commonly used as a proppant during hydraulic fracturing and as sand control particulates in gravel packing operations. In such operations, sand dust may be released on-the-fly as well as during transport of the proppant to the wellsite. Recently, the release of dust from fracturing operations has come under close scrutiny as health concerns upon field workers and those within residential areas within the vicinity of on-shore fracturing has risen.

Methods of inhibiting or preventing the generation and formation of dust from sand have been sought.

SUMMARY OF THE DISCLOSURE

The disclosure relates to composites and to methods of using the composites. In an embodiment of the disclosure, a composite is disclosed comprising sand and a polyionic polymer, such as a polycationic polymer. The polyionic polymer is coated onto at least a portion of the surface of the sand.

In another embodiment of the disclosure, a composite is disclosed comprising sand and a polycationic polymer coated onto at least a portion of the surface of the sand, wherein the polycationic polymer is (i) a polyallylamine hydrochloride homo- or copolymer, salt or quaternized derivative, optionally comprising modifier units; (ii) a polyethyleneimine, salt or quaternized derivative thereof; (iii) a polyvinylamine homo- or copolymer, salt or quaternized derivative thereof optionally comprising modifier units; (iv) a poly[vinylbenzyl-tri($C_1$-$C_4$ alkyl)ammonium salt] or a quaternized derivative thereof; (v) a polymer resulting from a step-wise polymerization (quaternization) reaction between a dihalide and N,N,N',N'-tetra($C_1$-$C_4$ alkyl)-alkylenediamine; (vi) a poly(vinylpyridine) or poly(vinylpyridinium salt) homo- or copolymer or a quaternized derivative thereof; (vii) a polymer via ring-forming polymerization of N,N-diallyl-N,N-di(C1-C4 alkyl)ammonium halide, comprising units of the formula:

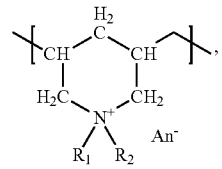

wherein $R_1$ and $R_2$ are each independently $C_1$-$C_4$ alkyl, in particular methyl, and An$^-$ is an anion, for example, a halide anion such as the chloride anion; (viii) a homo- or copolymer of a quaternized di($C_1$-$C_4$ alkyl)aminoethyl acrylate or methacrylate; (ix) a polyaminoamide (PAMAM), a salt or quaternized derivative thereof; or (x) a mixture of any of (i) through (ix).

In another embodiment of the disclosure, a method of reducing the amount of dust generated from sand is provided wherein at least a portion of the surface of the sand is coated with a polyionic polymer.

In another embodiment, a method of suppressing the generation of dust from particulates of sand at a wellsite is disclosed. In this embodiment, a polyionic polymer may be applied to at least a portion of the surface of the sand particulates. The polyionic material may be applied to the surface of the sand particulates during loading of the sand particulates from a sand mine onto a transport vehicle or into a storage receptacle. The polyionic material may further be applied during transloading of the sand particulates from a transport vehicle to another transport vehicle or during unloading of the sand particulates from a transport vehicle to a storage receptacle. Further, the polyionic material may be applied to the surface of the sand particulates during loading of the sand particulates from a storage receptacle to a transport vehicle or another storage receptacle. Still further, the polyionic material may be applied to the surface of the sand particulates after the sand particulates are unloaded from a transport vehicle into one or more storage receptacles but prior to loading the sand particulates into a blender at the wellsite. The polyionic material may also be applied to the surface of the sand particulates as the sand particulates are loaded into a blender at the wellsite.

In another embodiment of the disclosure, a method of suppressing the generation of dust from sand at a wellsite is provided wherein a polyionic material is applied to at least a portion of the surface of the sand particulates after the sand particulates are transported from the mine.

In another embodiment of the disclosure, a method of reducing the amount of dust generated from sand is provided wherein at least a portion of the surface of the sand is coated with a polycationic polymer selected from the group consisting of (i) a polyallylamine hydrochloride homo- or copolymer, salt or quaternized derivative, optionally comprising modifier units; (ii) a polyethyleneimine, salt or quaternized derivative thereof; (iii) a polyvinylamine homo- or copolymer, salt or quaternized derivative thereof optionally comprising modifier units; (iv) a poly[vinylbenzyl-tri($C_1$-$C_4$ alkyl)ammonium salt] or a quaternized derivative thereof; (v) a polymer resulting from a step-wise polymerization (quaternization) reaction between a dihalide and N,N,N',N'-tetra($C_1$-$C_4$ alkyl)-alkylenediamine; (vi) a poly(vinylpyridine) or poly(vinylpyridinium salt) homo- or copolymer or a quaternized derivative thereof; (vii) a polymer via ring-forming polymerization of N,N-diallyl-N,N-di(C1-C4 alkyl)ammonium halide, comprising units of the formula:

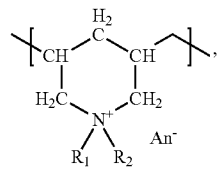

wherein $R_1$ and $R_2$ are each independently $C_1$-$C_4$ alkyl, in particular methyl, and An⁻ is an anion, for example, a halide anion such as the chloride anion; (viii) a homo- or copolymer of a quaternized di($C_1$-$C_4$ alkyl)aminoethyl acrylate or methacrylate; (ix) a polyaminoamide (PAMAM), a salt or quaternized derivative thereof; or (x) a mixture of any of (i) through (ix).

In another embodiment, a method of suppressing the generation of dust during the processing or transport of sand is provided wherein a polycationic polymer is coated onto at least a portion of the surface of the sand, wherein the polycationic polymer is (i) a polyallylamine hydrochloride homo- or copolymer, salt or quaternized derivative, optionally comprising modifier units; (ii) a polyethyleneimine, salt or quaternized derivative thereof; (iii) a polyvinylamine homo- or copolymer, salt or quaternized derivative thereof optionally comprising modifier units; (iv) a poly[vinylbenzyl-tri($C_1$-$C_4$ alkyl)ammonium salt] or a quaternized derivative thereof; (v) a polymer resulting from a step-wise polymerization (quaternization) reaction between a dihalide and N,N,N',N'-tetra($C_1$-$C_4$ alkyl)-alkylenediamine; (vi) a poly(vinylpyridine) or poly(vinylpyridinium salt) homo- or copolymer or a quaternized derivative thereof; (vii) a polymer via ring-forming polymerization of N,N-diallyl-N,N-di(C1-C4 alkyl)ammonium halide, comprising units of the formula:

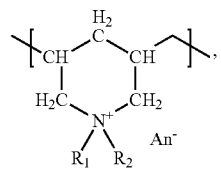

wherein $R_1$ and $R_2$ are each independently $C_1$-$C_4$ alkyl, in particular methyl, and An⁻ is an anion, for example, a halide anion such as the chloride anion; (viii) a homo- or copolymer of a quaternized di($C_1$-$C_4$ alkyl)aminoethyl acrylate or methacrylate; (ix) a polyaminoamide (PAMAM), a salt or quaternized derivative thereof; of a mixture of any of (i) through (ix).

In another embodiment of the disclosure, a method of suppressing the generation of dust during the processing or transport from sand is provided wherein a polyallylamine hydrochloride homo- or copolymer is coated onto at least a portion of the surface of the sand.

In another embodiment, a composite is provided comprises particulates having a positive or negative charge onto which is formed one or more polyelectrolyte layers.

In another embodiment, the composite comprises a particulate having coated on at least a portion of the surface of the particulate a polyionic polymer. The polyionic polymer may be a polycationic polymer such as (i) a polyallylamine hydrochloride homo- or copolymer, salt or quaternized derivative, optionally comprising modifier units; (ii) a polyethyleneimine, salt or quaternized derivative thereof; (iii) a polyvinylamine homo- or copolymer, salt or quaternized derivative thereof optionally comprising modifier units; (iv) a poly[vinylbenzyl-tri($C_1$-$C_4$ alkyl)ammonium salt] or a quaternized derivative thereof; (v) a polymer resulting from a step-wise polymerization (quaternization) reaction between a dihalide and N,N,N',N'-tetra($C_1$-$C_4$ alkyl)-alkylenediamine; (vi) a poly(vinylpyridine) or poly(vinylpyridinium salt) homo- or copolymer or a quaternized derivative thereof; (vii) a polymer via ring-forming polymerization of N,N-diallyl-N,N-di(C1-C4 alkyl)ammonium halide, comprising units of the formula:

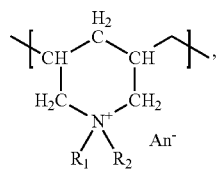

wherein $R_1$ and $R_2$ are each independently $C_1$-$C_4$ alkyl, in particular methyl, and An⁻ is an anion, for example, a halide anion such as the chloride anion; (viii) a homo- or copolymer of a quaternized di($C_1$-$C_4$ alkyl)aminoethyl acrylate or methacrylate; (ix) a polyaminoamide (PAMAM), a salt or quaternized derivative thereof; or (x) a mixture of any of (i) through (x).

The disclosure further relates to a well treatment fluid containing a well treatment particulate coated with polyelectrolyte layers or the polycationic polymer. In addition, the disclosure relates to a method of making the coated particulates and a method of using the coated particulates in the treatment of a well.

In another aspect, the composite comprises a particulate having a negative charge on its surface; the polycationic polymer being coated onto at least a portion of a particulate bearing the negative charge.

In another embodiment, the surface of the particulate is charged and the polyelectrolyte layers are formed onto the charged particulate surface. Each of the polyelectrolyte layers is composed of one or more distinct polyionic materials. The polyionic materials of adjacent polyelectrolyte layers are oppositely charged.

The presence of the polyelectrolyte layers or the polycationic polymer on the surface of the particulate reduces the amount of dust generated from the particulate. Thus, when the particulate is to be used as a proppant or sand control particulate, the presence of the two or more polyelectrolyte layers or the polycationic polymer onto the proppant or sand control particulates reduces the amount of dust and fines generated from the particulate, during transport of the particulate as well during manufacture of the particulate.

In another embodiment, the presence of the two or more polyelectrolyte layers or the polycationic polymer reduces the amount of dust generated by the particulate during transport of the particulate as well as during the manufacture of the particulate.

In an aspect, the surface of the particulate is combined with two or more polyelectrolyte multi-layers to form a composite. The multi-layers may be a bilayer, trilayer, etc. For example, a composite may be composed of more than one polyelectrolyte bilayer coated onto at least a portion of the surface of the particulate such that a second polyelectrolyte bilayer is coated onto the first polyelectrolyte bilayer (the polyelectrolyte bilayer adjacent to the surface of the particulate). A third polyelectrolyte bilayer may be coated onto the second polyelectrolyte bilayer, a fourth polyelectrolyte bilayer may be coated onto the third polyelectrolyte bilayer and so on. Each polyelectrolyte bilayer contains a bottom layer and a top layer which contain polyionic material. The polyionic material of the bottom layer and the polyionic material in the top layer are oppositely charged (counterions). The bottom layer of each polyelectrolyte layer contains polyionic material which has a charge which is opposite to the charge of the polyionic materials in the top layer of the polyelectrolyte bilayer which is adjacent to it. For example, where the particulate is coated with three polyelectrolyte bilayers then the polyionic material of the bottom layer of third polyelectrolyte bilayer has a charge which is opposite to the charge of the polyionic material of the top layer of the second polyelectrolyte bilayer and the polyionic material of the bottom layer of the fourth polyelectrolyte bilayer has a charge which is opposite to the charge of the polyionic material of the top layer of the third polyelectrolyte bilayer.

In another aspect, the surface of the particulate contains a charge (for instance, where the particulate surface has been surface modified). In this instant, the polyionic material of the bottom layer of a polyelectrolyte multi-layer coated onto the surface of the particulate (a first polyelectrolyte bilayer) has a charge which is the opposite to the charge on the surface of the particulate. The polyionic material of the top layer of the first polyelectrolyte bilayer is a counterion to the polyionic material of the bottom layer of the polyelectrolyte bilayer.

In another aspect, where the polyionic material of the bottom layer of the first polyelectrolyte multi-layer (e.g., a bilayer) is positively charged and the polyionic material of the top layer of the first polyelectrolyte bilayer is negatively charged, a second top layer may be added to the polyelectrolyte bilayer such that the most distant layer from the surface of the particulate is positively charged. In an exemplary aspect, where the surface of the particulate contains a negative charge, the first polyelectrolyte bilayer may be composed of three layers, each containing a polyionic material wherein such layers consist of the bottom layer (adjacent to the particulate surface), a first top layer and a second top layer.

BRIEF DESCRIPTION OF THE DRAWINGS

In order to more fully understand the drawings referred to in the detailed description of the present disclosure, a brief description of each drawing is presented, in which.

DETAILED DESCRIPTION OF THE PREFERRED EMBODIMENTS

Figure 1:
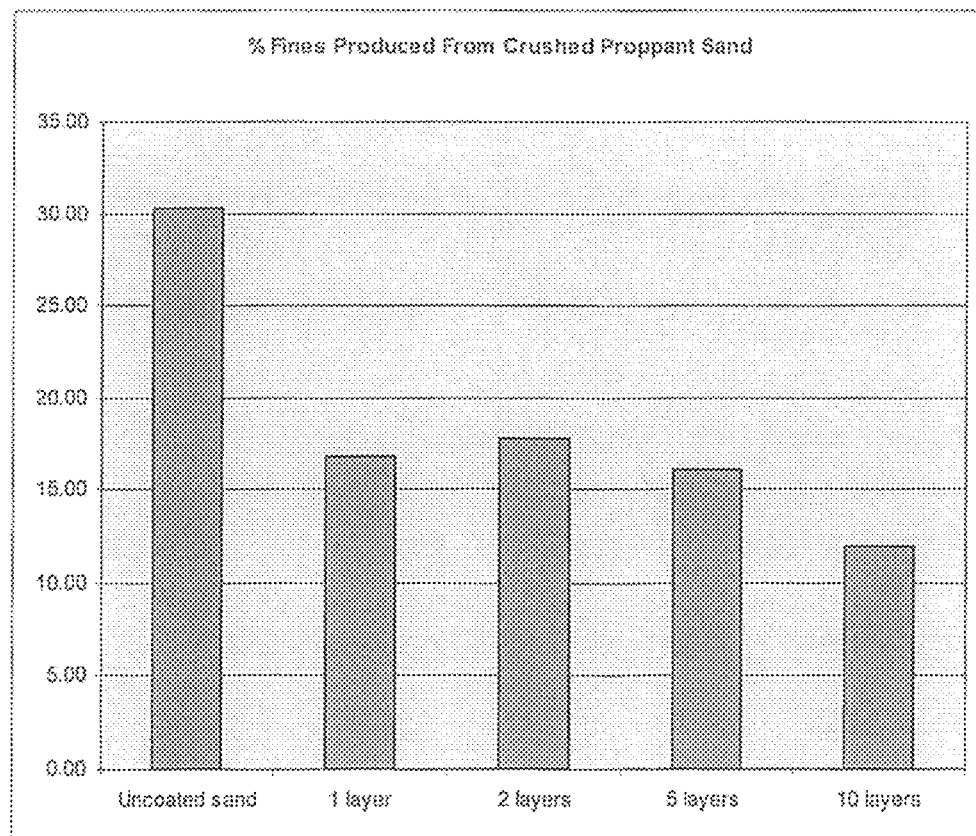
FIG. 1 illustrates the reduction in fines of uncoated sand particulates and composites of coated sand particulates defined herein after crushing for two minutes at 5550 pounds per square inch (psi).

Illustrative embodiments of the disclosure are described below as they might be employed in the operation and in the treatment of oilfield applications. In the interest of clarity, not all features of an actual implementation are described in this specification. It will of course be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the disclosure will become apparent from consideration of the following description.

The present application is directed to a composite containing a particulate and a polyionic polymer coated onto at least a portion of the surface of the particulate. The particulate onto which the polyionic polymer is coated may have a cross sectional length less than 30 micrometers.

In an embodiment, the particulate is sand, known to generate or form dust. The generation of dust from the particulate not at least partially coated with the polyionic material may be acute during handling or transport of the particulate or during use of the particulate. Application of the polyionic polymer onto at least a portion of the surface of sand is known to suppress or inhibit the generation or formation of dust from the sand particulate. The composite may be used as a replacement for sand in any situation where dusting is a cause of concern.

In an embodiment, the composite may be used in the construction industry and mining industry as well as during a treatment operation of a well. The composite may also be used domestically or for recreational purposes. For example, the composite may be used as a blasting sand as well as construction sand. The composite may be used as a component in stucco, plasters, roofing, bricks, grout, concrete and paints. The composite may further be used as foundry sand. The composite may be used as a component of a mixture and may be of particular benefit to manufacturers and formulators. The composite may also be used as a filter, play sand, cat litter or on golf courses, sport fields, playgrounds, etc. The composite may also be used as proppant or sand control particulate in hydraulic fracturing and gravel packing, respectively.

In addition to sand, the particulate may be deformable or non-deformable and may be non-porous or porous and may be inorganic or organic in nature. In a preferred embodiment, the particulate is non-deformable and, in addition to sand, may be composed of quartz, sand, glass beads, plastics, aluminum pellets, ceramics (including porous ceramics) or a polymeric material.

The particulate may also be a deformable particulate (particulates that yield upon application of a minimum threshold level to point to point stress) include naturally occurring materials, such as (a) chipped, ground or crushed shells of nuts such as walnut, pecan, coconut, almond, ivory nut, brazil nut, etc.; (b) chipped, ground or crushed seed shells (including fruit pits) of seeds of fruits such as plum, olive, peach, cherry, apricot, etc.; (c) chipped, ground or crushed seed shells of other plants such as maize (e.g., corn cobs or corn kernels), etc.; and (d) processed wood materials such as those derived from woods such as oak, hickory, walnut, poplar, mahogany, etc. Deformable particulates may further include such copolymers as polystyrene divinylbenzene terpolymers (including polystyrene/divinyl benzene) and acrylate-based terpolymers, and polymers of furfuryl derivatives, phenol formaldehyde, phenolic epoxy resins, polystyrene, methyl methacrylate, nylon, polycarbonates, polyethylene, polypropylene, polyvinylchloride, polyacrylonitrile-butadiene-styrene, polyurethane, polyethylene terephthalate and mixtures thereof.

Other suitable particulates include those relatively lightweight particulates having an apparent specific gravity (ASG) (API RP 60) less than 2.65. For instance, the relatively lightweight particulates are ultra lightweight (ULW) having an ASG less than or equal to 2.45. Even more preferred are those ULW particulates having an ASG less than or equal to 2.25, preferably less than or equal to 2.0, more preferably less than or equal to 1.75, even more preferably less than or equal to 1.5, most preferably less than or equal to 1.25.

The number average molecular weight of polyionic materials used to render the composite is typically from about 50,000 to about 1,000,000 g, more typically from about 70,000 to about 200,000 g.

In addition to being applied as a single layer to the surface of the particulate, two or more layers of polyelectrolyte, each layer comprising polyionic material, may be coated onto the particulate. The polyionic material in each polyelectrolyte layer has a like charge and may be composed of the same ionic material or multiple ionic materials. Thus, for example, a polyelectrolyte layer may contain positive charged polyionic material, the polyionic material being a mixture of positively charged species.

The polyionic material used in the composite refers to a charged polymer that has a plurality of charged groups in a solution, or a mixture of charged polymers each of which has a plurality of charged groups in a solution. Exemplary charged polymers include polyelectrolytes. Polyionic materials include both polycationic (having positive charges) and polyanionic (having negative charges) polymeric materials.

The polyionic materials that may be employed in the present disclosure include polyanionic and polycationic polymers. Examples of suitable polyanionic polymers include, for example, a synthetic polymer, a biopolymer or modified biopolymer comprising carboxy, sulfo, sulfato, phosphono or phosphate groups or a mixture thereof, or a salt thereof.

Examples of synthetic polyanionic polymers are: a linear polyacrylic acid (PAA), a branched polyacrylic acid, a polymethacrylic acid (PMA), a polyacrylic acid or polymethacrylic acid copolymer, a maleic or fumaric acid copolymer, a poly(styrenesulfonic acid) (PSS), a polyamido acid, a carboxy-terminated polymer of a diamine and a di- or polycarboxylic acid, a poly(2-acrylamido-2-methylpropanesulfonic acid) (poly-(AMPS)), an alkylene polyphosphate, an alkylene polyphosphonate, a carbohydrate polyphosphate or carbohydrate polyphosphonate (e.g., a teichoic acid). Examples of a copolymer of acrylic or methacrylic acid include a copolymerization product of an acrylic or methacrylic acid with a vinyl monomer including, for example, acrylamide, N,N-dimethyl acrylamide or N-vinylpyrrolidone. Examples of polyanionic biopolymers or modified biopolymers are: hyaluronic acid, glycosaminoglycanes such as heparin or chondroitin sulfate, fucoidan, poly-aspartic acid, poly-glutamic acid, carboxymethyl cellulose, carboxymethyl dextrans, alginates, pectins, gellan, carboxyalkyl chitins, carboxymethyl chitosans, sulfated polysaccharides.

A preferred polyanionic polymer is a linear or branched polyacrylic acid or an acrylic acid copolymer. Another preferred anionic polymer is a linear or branched polyacrylic acid. A branched polyacrylic acid in this context is to be understood as meaning a polyacrylic acid obtainable by polymerizing acrylic acid in the presence of suitable amounts of a di- or polyvinyl compound.

The most preferred polyanionic polymer is poly(sodium styrene sulfonate).

A suitable polycationic polymer is, for example, a synthetic polymer, biopolymer or modified biopolymer comprising primary, secondary, or tertiary amines or quaternary ammonium groups or a suitable salt thereof, for example a hydrohalide such as a hydrochloride thereof, in the backbone or as substituents. Polycationic polymers comprising primary or secondary amino groups or a salt thereof are preferred.

Examples of synthetic polycationic polymers are:

(i) a polyallylamine hydrochloride (PAH) homo- or copolymer, optionally comprising modifier units;

(ii) a polyethyleneimine (PEI);

(iii) a polyvinylamine homo- or copolymer, optionally comprising modifier units;

(iv) a poly[vinylbenzyl-tri($C_1$-$C_4$ alkyl)ammonium salt], for example poly(vinylbenzyl-trimethylammonium chloride);

(v) a polymer resulting from a step-wise polymerization (quaternization) reaction between a dihalide and N,N,N',N'-tetra($C_1$-$C_4$ alkyl)-alkylenediamine, for example a polymer from (a) propylene-1,3-dichloride or -dibromide or o-, m-, or p-xylylene dichloride or dibromide and (b) N,N,N',N'-tetramethyl-1,4-tetramethylenediamine;

(vi) a poly(vinylpyridine) or poly(vinylpyridinium salt) homo- or copolymer; (vii) a polymer via ring-forming polymerization of N,N-diallyl-N,N-di(C1-C4 alkyl)ammonium halide, comprising units of the formula:

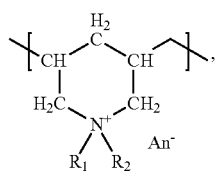

wherein $R_1$ and $R_2$ are each independently $C_1$-$C_4$ alkyl, in particular methyl, and $An^-$ is an anion, for example, a halide anion such as the chloride anion;

(viii) a homo- or copolymer of a quaternized di($C_1$-$C_4$ alkyl)aminoethyl acrylate or methacrylate, for example a poly[2-hydroxy-3-methacryloylpropyltri($C_1$-$C_2$ alkyl)ammonium salt] homopolymer, such as poly(2-hydroxy-3-methacryloylpropyltrimethylammonium chloride), or a quaternized poly(2-dimethylaminoethyl methacrylate or a quaternized poly(vinylpyrrolidone-co-2-dimethylaminoethyl methacrylate); or (ix) a polyaminoamide (PAMAM), for example a linear PAMAM or a PAMAM dendrimer.

The above mentioned polymers comprise in each case the free amine, a suitable salt thereof, as well as any quaternized form, if not specified otherwise.

The most preferred polycationic polymer is poly(diallydimethyl)amine hydrochloride) of the formula:

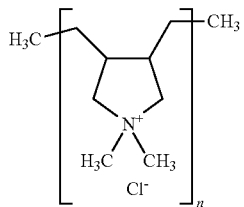

wherein n is from about 300 to about 6,300.

Suitable comonomers optionally incorporated in the polymers according to (i), (iii), (vi) or (viii) above are, for example, hydrophilic monomers such as acrylamide, methacrylamide, N,N-dimethyl acrylamide, N-vinylpyrrolidone and the like.

Suitable modifier units of the polyallylamine (i) are known and comprise, for example, units of formula:

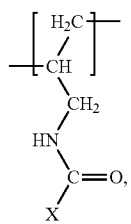

wherein X is $C_1$-$C_6$ alkyl, which is substituted by two or more of the same or different substituents selected from the group consisting of hydroxy, $C_1$-$C_5$ alkanoyloxy, and $C_1$$C_5$ alkylaminocarbonyloxy.

Preferred substituents of the alkyl radical X are hydroxy, acetyloxy, propionyloxy, methyl-aminocarbonyloxy or ethylaminocarbonyloxy, especially hydroxy, acetyloxy or propionyloxy and in particular hydroxy. X is preferably linear $C_3$-$C_6$ alkyl, more preferably linear $C_4$-$C_5$ alkyl, and most preferably n-pentyl, which is in each case substituted as defined above. A particularly preferred radical X is 1,2,3,4,5-pentahydroxy-n-pentyl.

Normally, it is not necessary to soak the particulate in a solution containing the polyionic material. A concentrated amount of the polyionic material may be mixed with the particulate at room temperature. The polyionic material will then dry quickly onto the surface of the particulate.

It may be preferred to use a particulate having a charged surface (such as a silicon charge) or to modify the surface of the particulate to provide a charged surface in order to enhance electrostatic bonding between the particulate and the polyionic layer most adjacent to the surface of the particulate.

When a polycationic polymer is applied to the particulate (in lieu of a series of polyelectrolyte layers), the surface of the particulate may be neutral or bear a negative charge. Typically, the surface of the particulate is modified to carry a negative charge prior to application of the polycationic polymer. For instance, where the particulate is a metal oxide, the charge on the metal oxide may be modified by titrating the oxide with dilute NaOH.

In a preferred embodiment, the particulate is sand. In this embodiment, the polyionic material may be a polycationic polymer which may be applied as a single layer onto at least a portion of the surface of the sand particulate. The coating of the polyionic material onto at least a portion of the surface of the particulate minimizes or suppresses the formation of harmful dust at a destination site. The destination site, as used herein, shall refer to any location where handling of the particulates by human contact may occur. It may include transfer points wherein the particulates are transferred from an originating source, such as a mine or quarry, to a transport vehicle or a storage receptacle, from a transport vehicle to a storage vehicle, from a storage vehicle to a transport vehicle, from a transport vehicle to another transport vehicle, from a storage receptacle to a final destination, from a transport vehicle to final destination, etc. The final destination shall refer to the point where the particulate is ultimately to be used by the end user. It may include, for example, the wellsite, construction site, recreational area, sports venue, etc.

Where a series of polyelectrolytes are applied onto the particulate, the particulate may be a neutral particulate whose surface has been modified to carry a positive or negative charge prior to application of the first polyionic layer. For instance, where the particulate is a metal oxide, the charge of the surface of the metal oxide may be modified by titrating the oxide with dilute HCl or dilute sodium hydroxide, depending on the charge of the particulate surface which is desired. Thus, the charged particulate may be silica or silicon wafer. Surface modification may thus be used to change the surface charge on the surface of the particulate such that the polyionic material of the bottom layer of the first polyelectrolyte bilayer deposited onto the surface of the particulate may more easily bind to the particulate surface. For instance, when the particulate is sand, the surface of the sand may be silylated in order to attract the charge of polyionic material of the bottom layer of the first polyelectrolyte bilayer, i.e., the polyionic material adjacent to the surface of the particulate. While it is more preferred to use a negative charge particulate, the surface of the particulate may bear a positive charge as well. For instance, when the particulate is ceramic, the surface of the ceramic may be hydroxylated in order to counter the charge of the polyionic material of the polyelectrolyte bilayer adjacent to the charged ceramic.

Polyelectrolyte layers may be formed on the surface of the particulate wherein polyionic material of like charges aggregate into discrete layers onto the particulate. Thus, for example, a polyelectrolyte layer of positive charged polyionic material may be adjacent to a negative charged particulate. A polyelectrolyte layer of negative charged polyionic material may be adjacent to the polyelectrolyte layer of positive charged polyionic material which is adjacent to the surface of the particulate. A succession of polyelectrolyte layers each comprised of polyionic material having counterions to the polyionic material of its adjacent polyelectrolyte may be formed. The number of polyionic layers on the particulate may be as high as 1,000 though usually is less than 40 and typically is between 2 and 20.

Thus, where the surface of the particulate is charged, the polyionic material of the polyelectrolyte layer ("the first polyelectrolyte layer") immediately adjacent to the charged surface of the particulate may have a charge counter to or opposite to that of the charged surface. The polyelectrolyte layer adjacent to the first polyelectrolyte layer (the "second polyelectrolyte layer") may have a charge counter to or opposite to that of the charge of the polyionic material of the first polyelectrolyte layer. The charge of the polyionic layer of the polyelectrolyte layer adjacent to the second polyelectrolyte layer ("the third polyelectrolyte layer") has a charge counter to or opposite to that of the charge of the polyionic material of the second polyelectrolyte layer, and so on.

In one embodiment, alternating polyelectrolyte layers composed of oppositely charged polyionic material are formed onto a charged surface of a particulate by simultaneously depositing, onto the surface of the particulate, material of opposite charges. The polyionic materials self-assemble onto the surface of the charged particulate much like oppositely charge magnets assemble with each other. Clusters of polyelectrolyte layers may be formed onto the particulate or more discrete polyelectrolyte layers may form onto the particulate. In one embodiment, polyelectrolyte layers having oppositely charged polyionic material may interlock with each other. This arrangement may strengthen the coating forming onto the particulate.

Thus, polyionic materials of like charge assemble to form the first polyelectrolyte layer, wherein the charge of the polyionic materials is counter to the charge of the charged surface of the particulate. The polyionic materials of like charge (opposite to the charge of the polyionic materials of the first polyelectrolyte layer) self-assemble to form the second polyelectrolyte layer, and so on.

The coating of one or more polyionic materials onto at least a portion of the surface of the particulates has been found to markedly reduce the amount of dust generated or released upon agitation of the particulates. Thus, in an embodiment, the presence of at least one polyionic material coated onto at least a portion of the surface of the particulate minimizes the amount of dust generated from the particulate during transport of the particulates as well as during dispensing of the particulates at a pre-determined venue. Such venue may include a wellsite, construction site, recreational area, sports venue, etc.

For example, the amount of dust generated during pumping of particulates at a wellsite (the surface of the particulates not having been coated with the polyionic material), is much higher than when the surface of the particulates are at least partially coated with the polyionic material. The presence of the polyionic layer(s) on the particulate may further reduce wear in pumping components and downhole tools, completion tubing and casing, and related hardware during operations.

The polyionic material(s) may be coated onto the surface of the particulate during extraction of the particulate from the mine or during processing or refining of the extracted particulate.

The polyionic material(s) may be coated onto the surface of the particulate after extraction and processing of the particulate while being loaded onto a transport vehicle, during loading of the particulate into a storage receptacle, during unloading of the particulate from a transport vehicle, during unloading of the particulate from a storage receptacle to a transport vehicle, during dispensing of the particulate at a pre-determined location, etc.

FIG. 3 illustrates representative points for coating the surface of extracted and processed sand particulates to a wellsite. FIG. 3 is exemplary of four alternative routes for transfer of particulates from an originating source (such as mine or quarry 310) after the particulates have been extracted and processed. The routes may involve one or more transport vehicles as well as one or more storage receptacles particulates. Exemplary transport vehicles may include a truck, rail car, barge, ship, etc.

Typically, sand particulates are brought in from the sand mine by tankers and then either fed from the tanker into a storage trailer or blown into the storage receptacle.

Typical storage receptacles are in the form of stationary containers, hoppers, or bins and may include proppant storage trailers often referred to as "mountain movers", "sand hogs" or "sand kings".

Possible locations of the treatment of the particulates with the polyionic material(s) are depicted in FIG. 3 by the symbol ♦. At any of the points designated, one or more polyionic materials may be applied onto the surface of the particulate. Suitable methods of application of polyionic materials may include use of a permanent spray system or mobile spray system at any of the points designated.

In a preferred embodiment, spray nozzles with adjustable speeds are used which provide a mist of the polyionic materials contained in small droplets of water. The polyionic material is applied onto the particulates at slow speeds and an angle of exposure from 35° to 1500°, preferably above 90°. By controlling the speed and the size of droplets of polyionic material, the minimum amount of polyionic material in an aqueous solution is needed. This leads to a particulate having a minimum amount of water and thus flows freely without having a wet aspect.

Thus, for instance, Route 1 shows the possible avenues for coating of the particulates to be during loading of the sand particulates from sand mine 310 onto transport vehicle 332 as well as during unloading of the particulates from transport vehicle 332 to blender 320 at the wellsite.

In the blender the treated particulates may be blended with other components comprising a well treatment fluid. Such other components may include one or more of the following: viscosifying agent, crosslinking agent, breakers, carrier fluid, scale inhibitors, asphaltene inhibitors, scavengers, surfactants, etc.

During the chain of transfer, it is possible that the particulates may be transferred from one transport vehicle to another. Route 2 shows the transfer of the particulates into first transport vehicle 342 and then to second transport vehicle 344 to blender 320 at the wellsite. Route 2 further shows an alternative avenue wherein particulates may be transferred from a transport vehicle (shown as second transport vehicle 344) to storage receptacle 343. The particulates may then be transported from storage receptacle 343 to blender 320 at the wellsite. Route 2 thus shows that the particulates may be treated at one or more of the following locations: during loading of the particulates from sand mine 310 onto first transport vehicle 342; during unloading of the particulates from first transport vehicle 342 onto second transport vehicle 344; during unloading of the particulates from second transport vehicle 344 into blender 320; during transfer of particulates from second transport vehicle 344 into storage receptacle 343; and during transfer of the particulates from storage receptacle 343 into blender 320 at the wellsite.

Route 3 shows an exemplary chain of transfer wherein the particulates may be transferred into a transport vehicle and then transferred from the transport vehicle into the blender at the wellsite. In particular, Route 3 is depicted as transferring the particulates from sand mine 310 into a first transport vehicle 352. The transported particulates may then be transferred into storage receptacle 353. At the wellsite the particulates into storage receptacle 353 are then transferred into blender 320. An alternative avenue in Route 3 is the transfer of the particulates from storage receptacle 353 into second transport vehicle 354. The particulates are then transported from second transport vehicle 354 into blender 320 at the wellsite. Route 3 thus shows that the particulates may be treated at one or more of the following locations: during loading of the particulates from sand mine 310 onto first transport vehicle 352; during unloading of the particulates from first transport vehicle 352 into storage receptacle 353; during transfer of the particulates from storage receptacle 353 into blender 320; during loading of the particulates from storage receptacle 353 onto second transport vehicle 354; and during transfer of the particulates from second transport vehicle 354 into blender 320 at the wellsite.

Route 4 shows an exemplary chain of transfer wherein the particulates may be transferred into (first) storage receptacle 363 from sand mine 310 and transported in (first) transport vehicle 362 into blender 320 at the wellsite. Route 4 also shows an alternate avenue wherein the particulates may be transported from first transport vehicle 362 into second storage receptacle 365 and then to blender 320. Still further, the particulates from second storage receptacle 365 may be transferred to a second transport vehicle 364 and then transported to blender 320. The surface of at least a portion of the particulates may be treated at one or more of the following locations in Route 4: during loading of the particulates from sand mine 310 into first storage receptacle 363; during unloading of the particulates from storage receptacle 363 onto transport vehicle 362; during unloading of the particulates from transport vehicle 362 into blender 320; during unloading of the particulates from first transport vehicle 362 into second storage 365; during transfer of the particulates from second storage receptacle 365 into blender 320; during transfer of the particulates from second storage 365 into second transport vehicle 364; and during transfer of the particulates from second transport vehicle 364 into blender 320.

Figure 3:
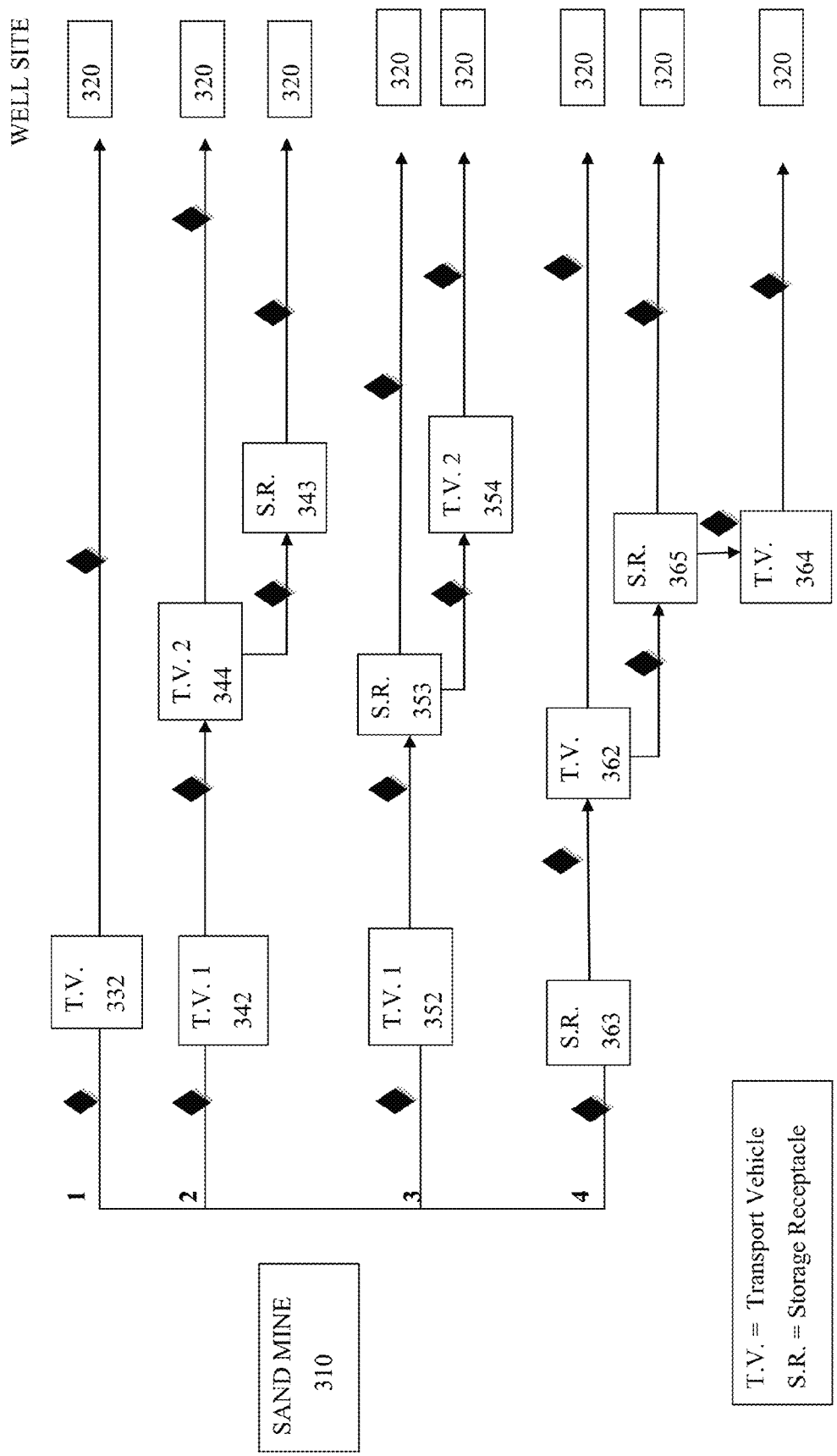
FIG. 3 illustrates exemplary points during the transport of sand from a sand mine to a wellsite where a polyionic material may be coated onto at least a portion of the surface of the sand.

It is understood that FIG. 3 is merely exemplary of points within the chain of transfer of the particulate from originating source 310 to blender 320 where the particulate may be coated with polyionic material(s). Combinations of the routes and/or avenues described above are plausible as well as any other route involving transference of the particulate into the blender. Moreover, while FIG. 3 shows only one or two transport vehicles as well as storage receptacles, it is possible for the chain of transfer to include transfer into multiple transport vehicles as well as storage receptacles. Typically, the composite may be transferred to more than one transport vehicle prior to delivery of the composite to the wellsite. In many instances, the composite is transferred multiple times within a supply chain prior to reaching the destination for its use.

Figure 4:
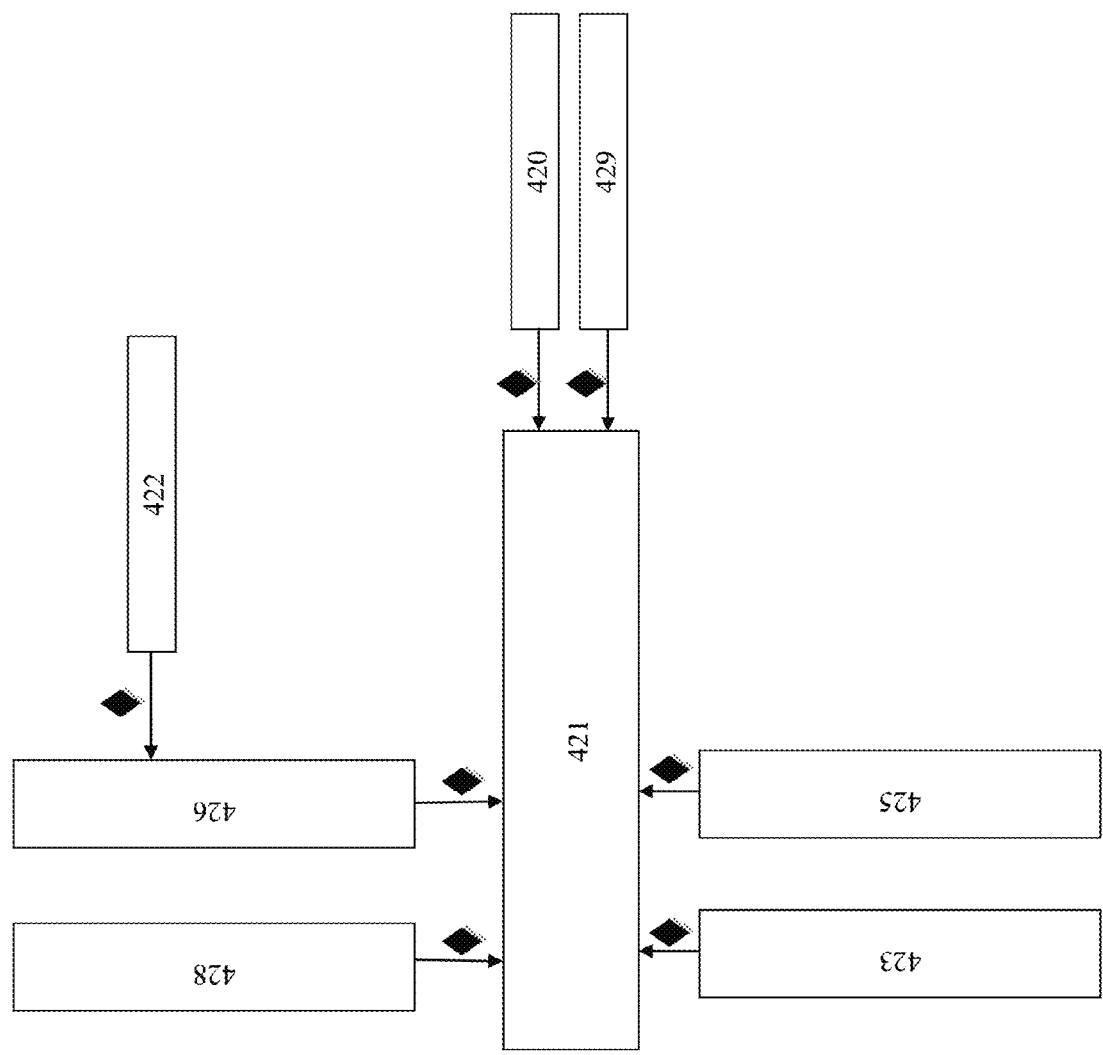
FIG. 4 illustrates a method of applying a polyionic material onto the surface of sand particulates having been stored in multiple storage receptacles by use of a dual belt conveyor.

FIG. 4 illustrates a preferred embodiment of applying the polyionic material(s) onto the surface of the particulates at a final destination point using dual belt conveyor 421. The final destination point in FIG. 4 is a wellsite. As illustrated, uncoated (or untreated) particulate may be unloaded from one or more transport vehicles (illustrated as transport vehicle 422) into storage receptacles 426 and 428 as well as 423 and 425. A conveyor is typically used to deliver particulate into the storage receptacles from the transported vehicle. Storage receptacles 426 and 428 are illustrated as being on opposite sides of dual belt conveyor 421 from storage receptacles 423 and 425. The polyionic material may be applied onto the surface of the particulates as the particulates are fed into the storage container (shown as particulate being loaded into storage receptacle 426 from transport vehicle 422). Likewise, the polyionic material(s) may be coated onto the particulates as they are transferred from the storage receptacles by a conveyor onto dual belt or T-belt conveyor 421. The T-belt conveyor runs transversely where the sand particulates are collected from the multiple storage receptacles. A conveyor belt may run from the bottom of the storage receptacle to the T-belt conveyor.

Coating of the polyionic material(s) onto the surface of the particulates may also occur during transfer of the particulates on conveyor 421 into the hopper of one or more mixing blenders at the wellsite, illustrated in FIG. 4 as dual blenders 420 and 424.

In a preferred embodiment, the particulate is coated with the polyionic material(s) at a single point within the chain of transfer. For instance, the particulate is preferably coated onto the surface of the particulate at the site of the supplier as the particulate is being loaded onto the transport vehicle or into a storage receptacle; during loading of the particulate from a transport vehicle into another transport vehicle or storage receptacle; during loading of the particulates form a storage receptacle to a transport vehicle or another storage receptacle; after the particulates are unloaded from to transport vehicle into one or more storage receptacles but prior to loading the sand particulates into a blender at the wellsite as well as while the particulates are being loaded into a blender at the wellsite.

While in a preferred embodiment, the entire surface of the particulate is coated with polyelectrolyte layers, a portion of the surface of the particulate may be coated as well. For instance, between from about 5 to about 100 percent of the surface of the particulate may be coated with the polyelectrolyte layer. In one embodiment, thereof less than or equal to 25 percent of the surface of the particulate may be coated with the polyelectrolyte layer. In another embodiment, less than or equal to 50 percent of the surface of the particulate may be coated with the polyelectrolyte layer. In another embodiment, less than or equal to 75 percent of the surface of the particulate may be coated with the polyelectrolyte layer. Further, all or a portion of a polyelectrolyte layer may be coated onto an adjacent oppositely charged polyelectrolyte layer.

Figure 5:
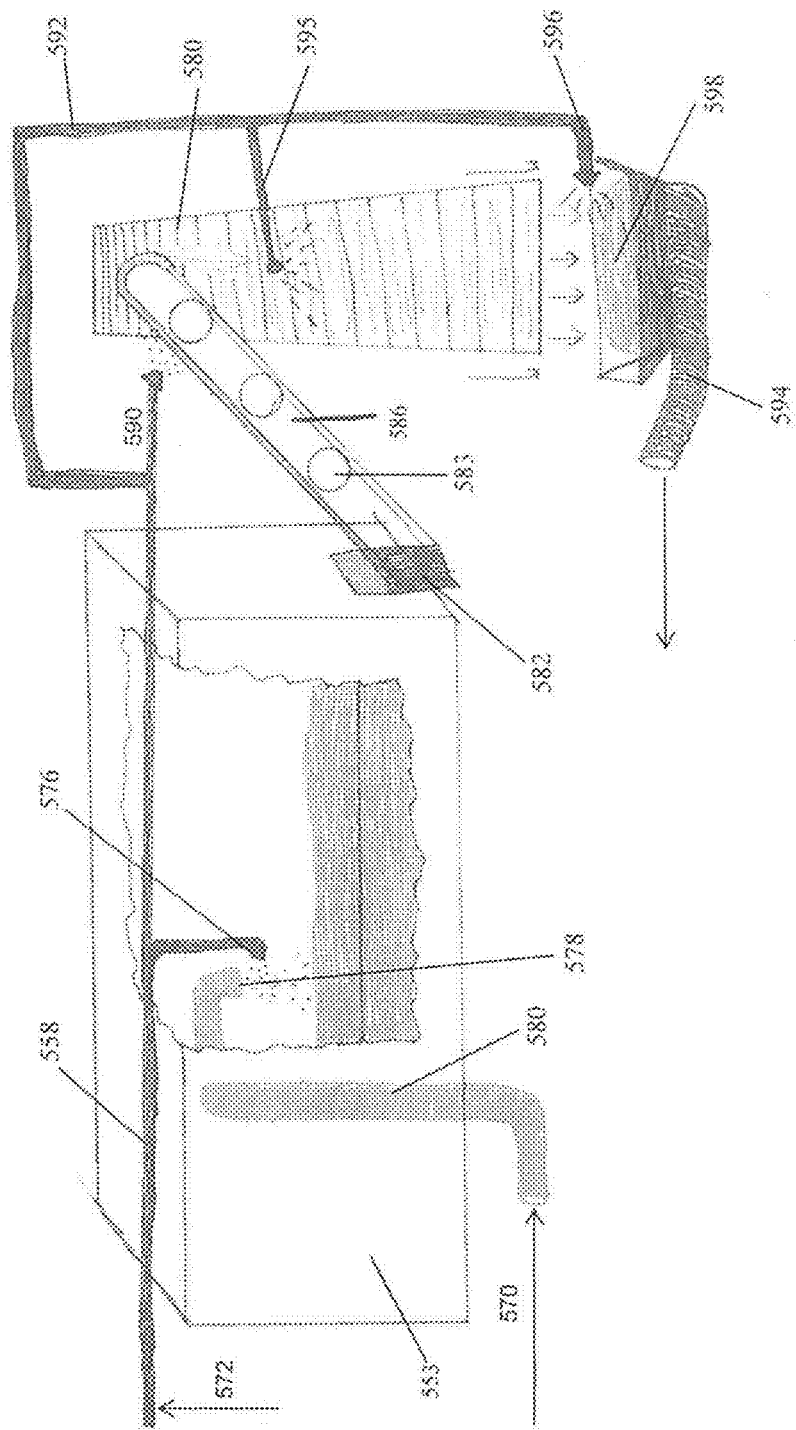
FIG. 5 illustrates a method of applying a polyionic material onto at least a portion of the surface of sand particulates within a storage receptacle.
Figure 6:
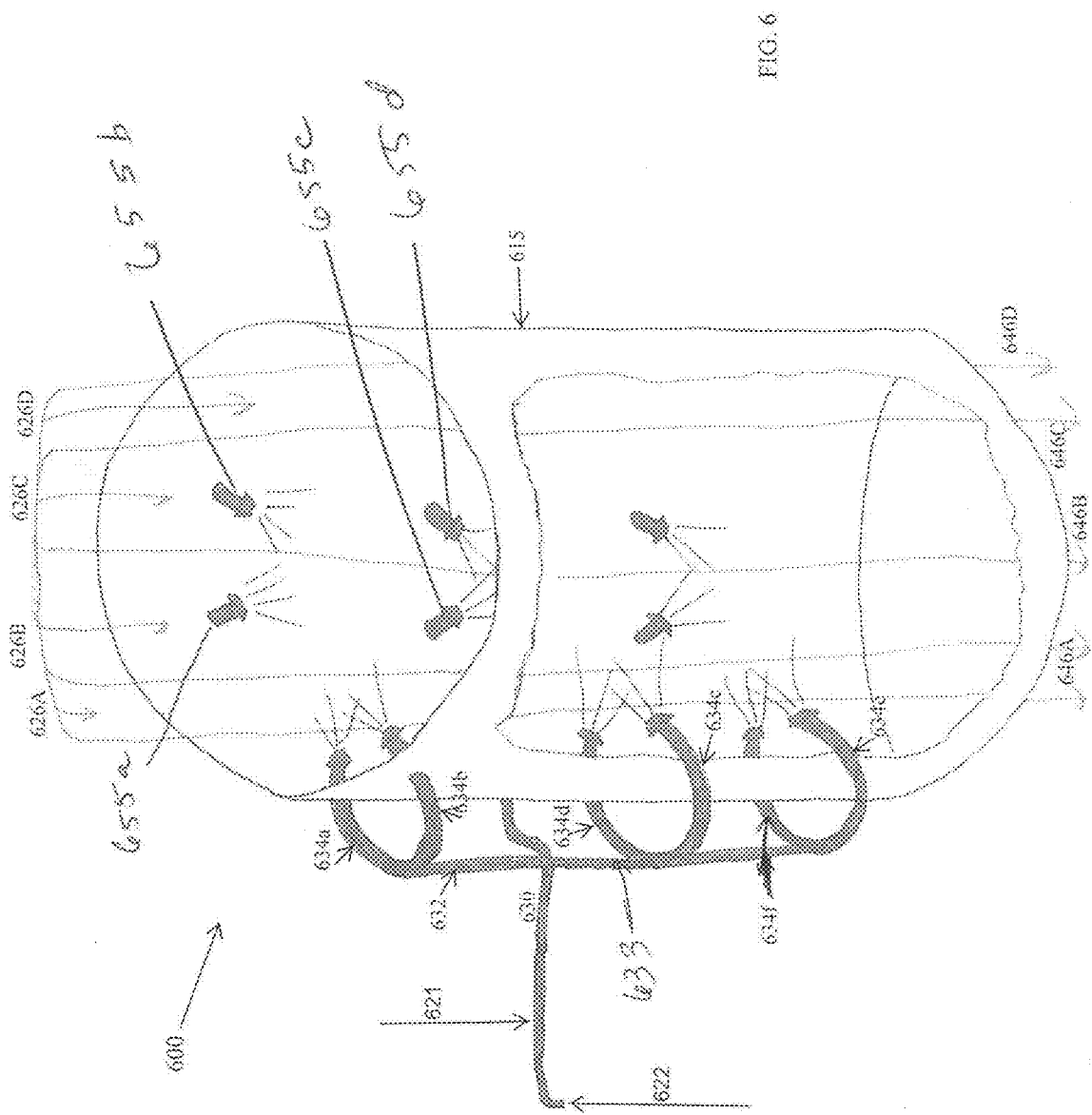
FIG. 6 represents an exemplary sprayer for applying a polyionic material onto at least a portion the surface of sand particulates.

FIG. 5 represents an illustration of a representative method of applying a polyelectrolyte layer onto at least a portion of the surface of particulates. As illustrated, sand particulates are fed into a storage receptacle 553, such as a Sand King, through transport tube 580 via line 570. FIG. 5 shows polyelectrolyte being fed into spray nozzle or spray bar 558 through line 572 and impinges on the sand particulates inside storage receptacle 553. FIG. 5 further shows the polyelectrolyte exiting stationary spray bar 558 at exit port 576 as the sand particulates exit through port 578 from transport tube 580.

The polyionic material is contained in an aqueous fluid and atomization of aqueous droplets onto the particulates is achieved by pumping water through the spray bar and/or spray arms at high pressure or by using a combination of compressed air and aqueous solution containing the polyionic material. In a preferred embodiment, the polyelectrolyte is applied onto at least a portion of the particulates after the particulates are unloaded from a transport vehicle into the storage receptacle.

As an alternative to, or in addition, to the coating process in the above paragraph, FIG. 5 further illustrates sand particulates 583 exiting storage receptacle 553 through exit port 582. Sand particulates 583 traverse pathway 586 and enter onto moving conveyor 580. Spray arm 590 may extend from spray bar 558 and polyelectrolyte may be sprayed onto sand particulates 583 as the sand particulates are moved along pathway 586. Spray arm 590 may be stationary or may be movable as the sand particulates move along pathway 586. Alternatively, or in addition to this, spray arm 592 may extend from spray bar 558 and polyelectrolyte may be applied onto the sand particulates as they traverse down moving conveyor 580 through spray arm extension 595. In addition to or as an alternative, the polyelectrolyte may be applied onto the sand particulates through spray arm extension 596 as the sand particulates move off of moving conveyor 580 into mixing blender 598. From blender 598 the coated particulates may be fed through tubing 594 downhole.

FIG. 6 represents pressure sprayer 600 for applying the polyelectrolyte onto the surface of sand particulates. In FIG. 6, polyelectrolyte may be fed through line 621 and pressurized air through feed line 622. Air atomizing nozzles on the spray bar and spray arms and compressed air provide very small drops of polyionic material onto the particulate. The polyionic material moves under pressure through spray bar 630 which bifurcates into pathway 632 and pathway 633. Horseshoe bars extend from pathway 632 and pathway 633 and provide multiple entry ports (634*a*, 634*b*, 634*c*, 634*d*, 634*e* and 634*f*) of polyelectrolyte into the interior of sprayer housing 615. Polyelectrolyte entry ports 655*a*, 655*b*, 655*c* and 655*d* into sprayer housing 615 may further appear on the uppermost portion of the sprayer housing from a spray bar (not shown). As sand particulates (shown as 626A, 626B, 626C and 626D) traverse along the interior of the housing 615, polyelectrolyte is sprayed onto the particulates. At least a portion of the surface of the particulates may be coated with the polyelectrolyte once exiting the housing as coated particulates 646A, 646B, 646C and 646D.

In addition, one or more polyionic layer(s) may be coated onto the particulates either during extraction from a mine or during processing of extracted raw particulates. Methodologies of extraction and processing of sand may vary widely. Sands suitable for fracturing exhibit high compressive strength (generally between from about 3,000 psi to about 14,000 psi) and are typically found in poorly cemented or unconsolidated sandstones.

FIG. 7 illustrates a representative flow diagram where sand may be coated with a polyionic layer(s) at or in close proximity to the sand mine or at a processing facility prior to loading processed sand particulates into a transport vehicle. Also illustrated in FIG. 7 are illustrative representative points for coating at least a portion of the surface of sand particulates with a polyionic material(s). While FIG. 7 primarily relates to the coating of frac sand, it is understood that it is applicable as well to the coating of sand used in other industries and purposes. Further, it is understood that any or all of the processes referenced in FIG. 7 may be included during excavation and/or processing of frac sand.

Referring to FIG. 7, a common method of excavating frac sand from sand mine 710 is by the use of large tracked excavators or front end loaders. Sand 714 extracted from sandstone with the front end loader is typically then dumped into transport vehicle 716 for transport to processing facility 718 or placed onto conveyor belt 720 for transit to processing facility 718. Processing facility 718 may be at the site of sand mine 710 or remote from sand mine 710.

FIG. 7 illustrates coating of the polyionic material(s) may be applied (designated by the symbol ♦ onto at least a portion of the surface of the sand particulates) during loading of the extracted raw sand onto transport vehicle 716, during unloading of transported sand particulates 712 to processing facility 718, during loading of sand particulates from sand mine 710 onto conveyor belt 720 or during transit of the sand particulates on conveyor belt 720 into processing facility 718.

Raw sand 714 may also be excavated from sand mine 710 by hydroblasting (optionally with the use of crushers) wherein a high pressure water stream 722 is used to loosen the weakly cemented sandstone, while keeping the individual round grains of raw frac sand intact. As illustrated, the water stream used in hydroblasting of the sand particulates from the sandstone may contain a polyionic material. At least a portion of the extracted raw sand (even prior to further processing) may be coated with the polyionic material(s) present in the water stream used in hydroblasting.

Since it is important that frac sand be of uniform size and shape, the extracted raw sand is typically further processed. Processing of the raw sand may or may not be on-site of the mine. Thus, the raw sand (optionally coated with a polyionic material(s)) may be transferred to an off-site processing area. In FIG. 7, the raw excavated sand is illustrated as being subjected to a washing process 724 in order to remove fine particles from sand particulates. Typically, washing is done by spraying the sand with water as it is carried over a vibrating screen. The fine particles are washed off the sand as the coarse particulates are carried along the screen by the vibration. As illustrated in FIG. 7, wash solution 726 fed into the washer may contain the polyionic material(s). Washed extracted sand 728 may contain the polyionic material(s) on at least a portion of its surface.

In some instances, washing process 724 may include the use of an upflow clarifier comprising a tank. Water (optionally with the polyionic material(s)) and sand may be continuously directed into the tank. Overflow water along with the fines overflow the tank while the washed sand falls by gravity to the bottom of the tank and is sent for further processing.

Washed sand 728 may then be sent to surge pile 730 where water adhering to the sand particles infiltrates back into the ground. From the surge pile, treated sand 732 may be sent to dryer 734. During transfer, the surface of treated sand may optionally be coated with polyionic material(s). In dryer 734, the sand is typically dried in a drum as hot air 736 is blasted into the drum. Fins inside the drum may agitate the sand and carry it forward through the dryer. When it reaches the end of the drum the sand is typically cooled.

Washed sand particulates are then typically sorted to isolate suitable sand meeting API specifications as frac sand. Typically, the washed sand (optionally dried and/or treated) is cooled prior to being subjected to treatment in sorter 740. Sorter 740 is typically one or more perforated sieves, screens or plates with different hole diameters or openings to separate the particles according to size.

Figure 7:
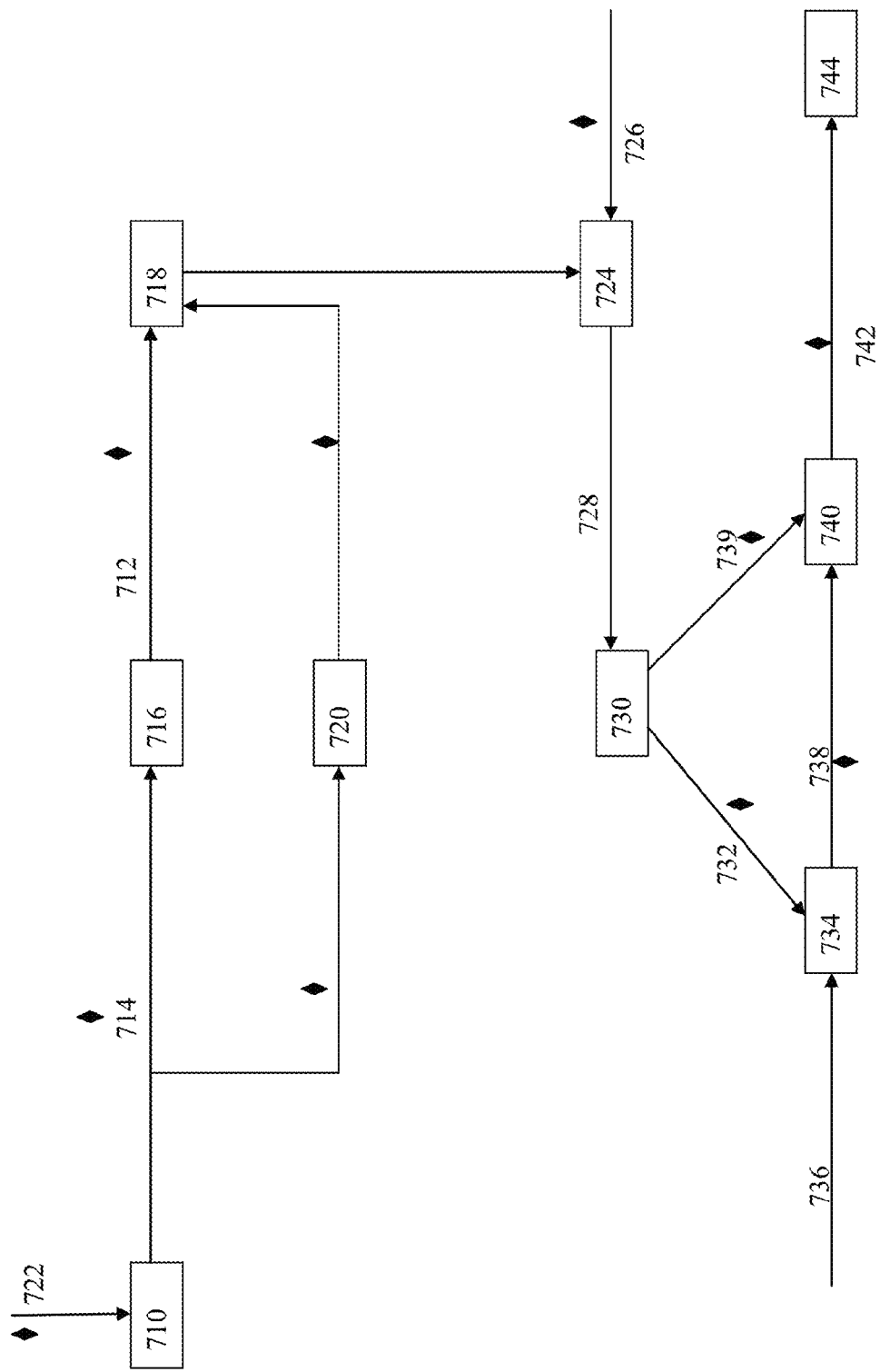
FIG. 7 illustrates a representative flow diagram for coating one or more polyionic materials at or in close proximity to the sand mine or at a processing facility prior to loading of the processed sand particulates into a transport vehicle.

FIG. 7 illustrates sorting of dried sand 738 though sand 739 may pass from surge pile 730 directly into sorter 740. In sorter 740, particulates of sand unsuitable for use in fracturing are separated. At least a portion of the surface of the sand particulates may be treated with the polyionic material(s) prior to being fed into sorter 740. Alternatively, screened frac sand 742 may be treated with the polyionic material(s) after exiting sorter 740. Thus, as illustrated in FIG. 7, the sand may be treated with the polyionic material(s) prior to being sorter, as it passes through the sorter or after being sorted.

After sorting, the finished product may be moved to bulk production warehouse or storage location 744. Storage location 744 may be a storage container, such as a silo, as well as an open location (such as a sand pile). The sorted sand may be treated with the polyionic material(s) during such movement. Thus, prior to loading the frac sand into the transport vehicle, such as transport vehicle 322 in FIG. 3, at least a portion of the surface of the sand may be coated with the polyionic material(s).

In an embodiment, a polyelectrolyte layer may be coated onto the particulate in the form of multi-layers of oppositely charged like charged layers, each layer comprising counterions to the polyionic material of the polyelectrolyte layer which is adjacent to it, i.e., the polyionic material in a layer has charge opposite to the charge of the polyionic material as its adjacent layer(s). For purposes herein, the innermost layer to the particulate, i.e., the layer immediately adjacent to the particulate, shall be termed "the bottom layer". The top layer is composed of polyionic material which is counterions to the polyionic material in the bottom layer. The bottom layer and the top layer constitute the polyelectrolyte bilayer. When more than two layers constitute the polyelectrolyte then each layer between the bottom layer and the top layer has a charge opposite to the layer to which it is adjacent.

In a preferred embodiment, the polyelectrolyte is a bi-layer and one or more polyelectrolyte bilayers are coated onto the surface of the particulate. Each successive polyelectrolyte bilayer would be coated onto the first polyelectrolyte layer which is adjacent to the particulate. Each additional polyelectrolyte bilayer consists of a bottom layer composed of a polyionic material and a top layer composed of a second polyionic material wherein the polyionic material in the bottom layers and top layers are oppositely charged.

Each polyelectrolyte multi-layer is laid onto the particulate in succession such as in a self-assembly. The polyionic material in the bottom layer of each successive polyelectrolyte multi-layer has a charge which is opposite to the charge of the polyionic material in the top layer to which the successive polyelectrolyte multi-layer is adjacent.

For example, where three polyelectrolyte bilayers are coated onto the particulate, the polyionic material in the bottom layer of the third polyelectrolyte bilayer is opposite to the charge of the polyionic material in the top layer of the second polyelectrolyte bilayer. In those instances where four polyelectrolyte bilayers are coated onto the particulate, the charge of the polyionic material in the bottom polyionic layer of the fourth polyelectrolyte bilayer is opposite to the charge of the polyionic material of the top layer of the third polyelectrolyte bilayer and so on.

When the surface of the particulate contains charged materials, it is necessary that the polyionic material of the bottom layer of the first polyelectrolyte bilayer coated onto the particulate have a charge which is the opposite to the charge of the surface of the particulate. The polyionic material of the top layer of the first polyelectrolyte bilayer is a counterion to the polyionic material of the bottom layer.

In some instances, the polyionic material of the bottom layer of the first polyelectrolyte bilayer may be positively charged. This would be the case, for example, where the surface of the particulate carries a negative charge. The polyionic material of the top layer of the first polyelectrolyte bilayer would thus carry a negative charge. In such instances, it may be desirable to apply a second top layer, i.e., a second coating on top of the first top coating, such that the polyionic material of the second top coating is oppositely charged to the polyionic material of the first top coating. The second top layer is often desirable in order to seal or embed the negatively charged polyionic material of the first top coating within the matrix defined by the first top layer and the bottom layer of the first polyelectrolyte layer. Thus, for instance, where the surface of the particulate is negatively charged, the bottom layer may be composed of positively charged polyionic material, the first top layer may be composed of negatively charged polyionic material and the second top layer would then be composed of positively charged polyionic material. The polyionic material of the bottom layer of a second polyelectrolyte bilayer, when present, would be of a negative charge.

It is often preferred to include nanoparticles in the polyionic solutions or in a fluid containing a polycationic polymer in order improve the performance of the deposited coating. Where a series of electrolyte layers are applied onto the particulate, the nanoparticles may be applied separately onto the particulate as alternating layers.

Since the nanoparticles are deposited along with the polyionic material or polycationic polymer onto the surface of the particulate, it is desirable that they have a surface charge allowing them to be deposited with and to bind to the polyionic materials or polycationic polymer. Any type of nanoparticle that has a surface charge capable of binding with the depositing polyelectrolytes or polycationic polymer may be used in accord with the principles of the disclosure. In an aspect, the nanoparticle may be a clay (such as bentonite and smectite clays), double layered hydroxides, carbon nanotubes, graphene oxide, metal phosphates (such as zirconium and titanium phosphate), metal sulfides (such as $WS_2$, $TaS_2$, $TiS_2$), metal oxides (such as alumina, silica, magnesium oxide, or zinc oxide.) When present, the amount of nanoparticles included in a fluid solution containing the polyionic materials or polycationic polymer may be between from about 0.01 to about 15, preferably from about 0.05 to about 10, volume percent.

A composite of coated multi layers of polyelectrolyte onto the particulate may be prepared by merely mixing two or more polyionic materials of opposite charges together in water. The aqueous mixture may then be deposited onto the surface of the particulate and the composite, then dried. During the process, polyelectrolytes of opposite charges aggregate with each other. All or a portion of the surface of the particulate may be covered by a polyelectrolyte layer having polyionic materials of a charge counter to the charge of the surface of the particulate. All or a portion of the polyelectrolyte layer adjacent to the surface of the particulate may be covered by a second polyelectrolyte layer having a charge opposite to the charge of the polyelectrolyte adjacent to the surface of the particulate. A succession of polyelectrolyte layers containing polyionic materials may be deposited onto the composite, each successive polyelectrolyte layer comprising polyionic materials having a charge opposite to the charge of the polyionic material of the polyelectrolyte layer adjacent to it.

Typically, the thickness of any polyelectrolyte layer will be less than about 50 nm, more typically from 5 nm to about 25 nm.

In a preferred embodiment, the particle size of the polyionic material and the particle size of the particulates are substantially the same (typically plus or minus 10%). In a preferred embodiment, the particle size of the polyionic material and the particulates is from about 50μ to about 2,000μ.

Normally, between from about 25 to 80 percent of the surface of the particulate is coated with the polyelectrolyte layer and between from about 25 to 80 percent of each polyelectrolyte surface is coated with a successively applied polyelectrolyte coating. In an embodiment, it is desirable to coat the particulate with an amount of polyelectrolyte layer such that all of the charges on the surface of the particulate will be countered with a charge from the oppositely charged polyionic material of the polyelectrolyte layer which is being applied. Likewise, the amount of a successive polyelectrolyte layer applied to an adjacent polyelectrolyte layer is the amount to counter the charges of the polyionic material to which the successive polyelectrolyte layer is being applied. As such, a 1:1 ratio of negative to positive charges is preferred.

The composite may further be prepared by a "layer-by-layer" methodology wherein each layer of a material is non-covalently bond to another layer of a different material.

For instance, the composite may be prepared by first contacting the particulate with a first coating solution which contains the polyionic material of the bottom layer in order to non-covalently apply the innermost layer of the polyionic material onto the surface of the particulate. Typically, the amount of polyionic material in a coating solution as defined herein is between from about 0.02 to about 2 percent by weight, typically between from about 0.05 to about 1 percent by weight.

The particulate having the innermost layer of the polyionic material attached to its surface is then contacted with a second coating solution containing the polyionic material comprising the top layer. The combination of the two layers of polyionic material forms a first polyelectrolyte bilayer on top of the particulate; the first polyelectrolyte bilayer consisting of the bottom or innermost layer to the particulate composed of a first polyionic material and a top layer of a polyionic material on top of the innermost layer; the second polyionic material having charges opposite of the charges of the first polyionic material. Additional layers may then be added to the particulate by further incorporating steps of contacting the particulate having the first polyelectrolyte bilayer with a third coating solution. The third coating solution contains a third polyionic material having a charge which is opposite to the charge of the second polyionic material. The third polyionic material may be the same as the first polyionic material or may be another polyionic material with the same charge as the first polyionic material. The third polyionic layer is thus formed on top of the first polyelectrolyte bilayer. A fourth polyionic coating may then be applied onto the third polyionic layer on the particulate in order to form a second polyelectrolyte bilayer composed of the third polyionic material and the fourth polyionic material. The fourth polyionic material has a charge opposite to the charge of the third polyionic material. The fourth polyionic material may be composed of the same material as the second polyionic material or may be another polyionic material with the same charge as the second polyionic material. The method may then be repeated in a like manner to form one or more additional polyelectrolyte bilayers.

One or more rinsing steps may be included during the process of making the composite, especially between steps of applying successive polyionic coating layers containing polyionic materials of unlike charges. The rinsing steps are carried out by contacting the particulate with a rinsing solution. The rinsing solution may be an aqueous solution.

To effectively deposit the first layer of polyionic material, the surface of the particulate may need to be charged making it capable of having electrostatic interactions with the polyionic material. For a proppant such as sand this step may be unnecessary. Sand is largely composed of silica ($SiO_2$), which has Si—O⁻ groups or Si—OH groups that readily hydrolyze, found along its surface. These Si—O⁻ groups allow for the first layer polyelectrolyte to bind. Other types of proppant may be neutrally charged at their surface and, hence, not capable forming a substantial electrostatic interaction to bind with the first polyelectrolyte layer. These proppants would have to undergo an initial step to place a charge on their surface. Any method that places a charge on the proppant surface allowing it to interact with the first polyelectrolyte layer is in accord with the principles of the present disclosure. For example, a proppant may need to undergo a silylation reaction placing Si—OH groups along its surface.

In preferred embodiments, the particulate coating that eliminates sharp edges on the particulate and functions as a lubricant to materially reduce mechanical erosion of the pumping components. Ideally, the coated particulate will have a low friction factor and high impact resistance that renders it resistant to chipping and shattering.

The layers of polyionic material bind to the surface of the particulate and to one another substantially through electrostatic forces.

While it is preferred that all polyionic materials forming the assembly coated onto the surface of the particulates be performed at a single location, different polyelectrolyte layers may be applied onto the particulate at multiple locations. Referring to FIG. 3, for example, it is possible for the particulate to be coated with a polycationic material in Route 3 during loading of the particulate into storage receptacle 353 from transport vehicle 1 and then a polyanionic material during loading of the polycationic coated particulate onto transport vehicle 354.

The composites defined herein are particularly effective in hydraulic fracturing as well as sand control fluids such as water, salt brine, slickwater such as slick water fracture treatments, low concentration polymer gel fluids (linear or crosslinked), foams (with gas) fluid, liquid gas such as liquid carbon dioxide fracture treatments for deeper proppant penetration, treatments for water sensitive zones, and treatments for gas storage wells.

The composites may be mixed and pumped during any desired portion of a well treatment such as hydraulic fracturing treatment or sand control treatment and may be mixed in any desired concentration with a carrier fluid. Suitable carrier fluids may be used in combination with gelling agents, crosslinking agents, gel breakers, surfactants, foaming agents, demulsifiers, buffers, clay stabilizers, acids, or mixtures thereof.

The use of the composites as a proppant advantageously provides for substantially improved overall system performance in stimulation procedure, such as hydraulic fracturing applications, as well as other well treating applications such as sand control. When used in hydraulic fracturing, the composites may be injected into a subterranean formation in conjunction with a hydraulic fracturing treatment or other treatment at pressures sufficiently high enough to cause the formation or enlargement of fractures.

Other well treating applications may be near wellbore in nature (affecting near wellbore regions) and may be directed toward improving wellbore productivity and/or controlling the production of fracture proppant or formation sand. Particular examples include gravel packing and "fracpacks." Moreover, such particles may be employed alone as a fracture proppant/sand control particulate, or in mixtures in amounts and with types of fracture proppant/sand control materials, such as conventional fracture or sand control particulate.

In one exemplary embodiment, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the composites and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore.

As an alternative to use of a screen, the sand control method may use the composites in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins is so desired.

In addition to hydraulic fracturing and sand control, the composites defined herein may be used in the corrosion protection of equipment, erosion/abrasion resistance of surfaces, chemical reaction delay mechanisms and other areas where a protective coating is beneficial. The composite may also reduce wear in pumping components, such as pump heads, and downhole tools, completion tubing and casing, and related hardware during operations.

EXAMPLES

The following examples describe the preferred embodiments of the present disclosure. Unless indicated to the contrary, percentage in the Examples refers to weight percent. Other embodiments within the scope of the claims will be apparent to those skilled in the art from the consideration of the specification or practice of the disclosure set forth herein. It is intended that the specification, together with the examples, be considered exemplary only, with the scope and spirit of the disclosure being indicated by the claims.

Example 1

To form the coating, the sand was placed in an aqueous solution of 0.5% poly(allylamine hydrochloride) and 0.1% sodium chloride. The solution was decanted and the sand was rinsed. The sand was then placed in an aqueous solution of 0.08% poly(sodium styrene sulfonate). The solution was then decanted and the coated sand was rinsed.

Example 2

To form the coating, the sand was placed in an aqueous solution of 0.5% poly(allylamine hydrochloride) and 0.1% sodium chloride. The solution was decanted and the sand was rinsed. The sand was then placed in an aqueous solution of 0.08% poly(sodium-4-styrene sulfonate) and 0.2% bentonite nanoclay. The solution was then decanted and the treated sand was then placed into an aqueous solution of 0.5% poly(allylamine hydrochloride) and 0.1% sodium chloride. The solution was then decanted and the coated sand was rinsed to form a polyelectrolyte bilayer (first polyelectrolyte bilayer) on the sand particulate. A second polyelectrolyte bilayer was further coated onto particulates coated with the first polyelectrolyte bilayer by placing such coated particulates in an aqueous solution of 0.08% poly (sodium-4-styrene sulfonate) and 0.2% bentonite nanoclay. The solution was then decanted and the treated sand was then placed into an aqueous solution of 0.5% poly(allylamine hydrochloride) and 0.1% sodium chloride. This process was repeated in succession to obtain a particulate containing 5 and 10 polyelectrolyte bilayers. The composites were then subjected to crush for 2 minutes at 5,550 psi. The results are graphically displayed in FIG. 1. FIG. 1 illustrates that crush resistance of the coated particulate was dramatically improved by coating of the particulate with one or more polyelectrolyte bilayers. FIG. 1 shows that one polyelectrolyte bilayer reduces fines production by almost one half and that ten layers of polyelectrolyte bilayers reduce fines to almost one third as compared to uncoated sand.

Example 3

A self-assembling coating having alternating layers of positively-charged [poly(diallyldimethylammonium chloride)] and negatively-charged (sodium poly styrene sulfonate) on frac sand proppant was prepared from an aqueous-based system. Approximately 1 volume percent of each of the two water-soluble polymers were combined in distilled water. About 200 mL of the resulting aqueous solution was then mixed with 250 g of frac sand and shaken for two minutes. During this shaking the polymers self-assembled into positive and negative layers over the surface of the sand grains. When the aqueous solution was then drained from the sand the polymer coating remain adhered to individual grains. The water-polymer solution was shown to be reusable multiple times. As a control, 250 g of frac sand was also shaken with 200 mL of deionized water which did not contain any polymers but simply rinsed away dust particles. To mimic the rough handling responsible for producing dust during transport and pumping, multiple 15 gram samples of frac sand were tumbled in a roller drum for three days. Other samples of the sand were left unrolled for comparison. The ability of the polymer coating to reduce dust was tested by measuring the turbidity of water shaken with a known amount of frac sand. To test the dust release, a 15 g sample of sand was combined with 22 mL of deionized water, shaken one minute, and then allowed to sit undisturbed for one minute before measuring turbidity. The results are set forth in Table I:

TABLE I

| Sand Treatment | FAU Turbidity Measurements |
|---|---|
| Rolled, unrinsed sand | 231 |
| Rolled, rinsed, uncoated sand | 88 |
| Rolled, coated sand | 31 |
| Non-rolled, unrinsed sand | 212 |
| Non-rolled, rinsed, uncoated sand | 66 |

Figure 2:
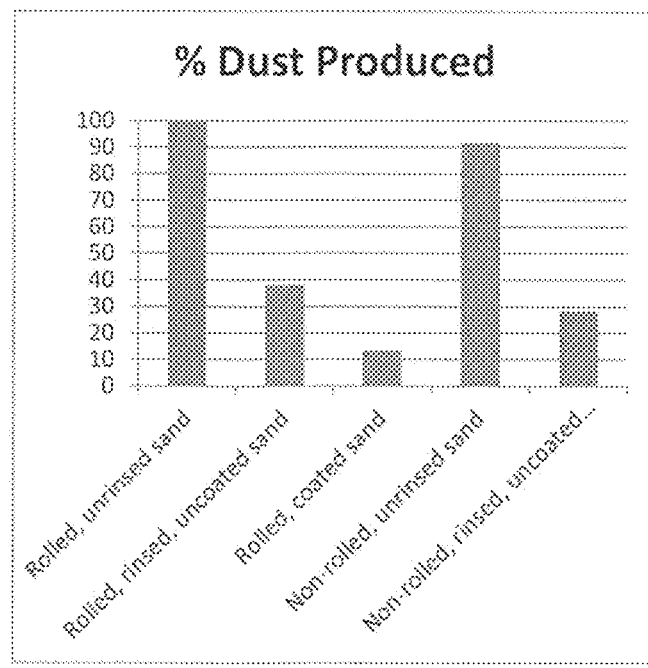
FIG. 2 illustrates the reduction in produced dust of uncoated sand particulates and composites of coated sand particulates defined herein.

As illustrated in Table I, unrinsed, uncoated, rolled sand had the highest turbidity measurement at 231 Formazin Attenuation Units (FAU). If the frac sand was rinsed once with deionized water before rolling, the turbidity measurement was reduced to 88 FAU. Frac sand coated with the self-assembling polymer layers had a turbidity of only 31 FAU after being rolled for three days. As illustrated in FIG. 2, this was an 87% reduction in dust released from the coated sand and a 65% reduction versus rinsed, uncoated sand. In comparison, non-rolled frac sand had a turbidity of 212 FAU if not rinsed and 66 FAU if rinsed once with deionized water. This corresponds to reduction in dust turbidity by the polymer-coated sand by 85% and 53% versus the non-rolled sands.

Example 4

About 1 lb of sand was sprayed with various amounts of an aqueous solution containing 0.5% of poly (diallyldimethylammonium chloride) and 0.4% sodium chloride, and then mixed for 20 minutes prior to drying. The resulting composite particles were then tested for the ability in producing less dust than non-coated particles. The ability of the polymeric coating to reduce dust was tested by measuring the turbidity of the samples before and after surface modification. The turbidity tests were performed accordingly to API RP 60, three data points were recorded for each sample than averaged. The results are tabulated in Table II. The benefits of surface treating the sand are clearly seen by the reduction in fines up to 90%.

TABLE II

| Description/Time moving sand in mixer to create fines | Modification Ratio (mL PDDA solution/lb. sand) | Average Turbidity (FTU) | % Dust Reduction |
|---|---|---|---|
| 100 mesh Unimin sand, as received | None | 61 | |
| 100 mesh Unimin sand/20 min | 8.4 | 6 | 90 |
| 100 mesh Unimin sand/1 hour and 20 min | 8.4 | 11 | 82 |
| 100 mesh Unimin sand/20 min | 16.8 | 34 | 44 |
| 40/70 Unimin white sand | None | 48 | — |
| 40/70 Unimin white sand/20 min | 9 | 18 | 63 |
| 40/70 Unimin white sand/1 hour and 20 min | 9 | 23 | 52 |

While the compositions and methods have been described in terms of preferred embodiments, it will be apparent to those of skill in the art that variations can be applied to the compositions and/or methods and in the steps or in the sequence of steps described herein without departing from the concept, spirit and scope of the disclosure. Moreover, it will be apparent that certain agents that are chemically related can be substituted for the agents described herein while the same or similar results would be achieved. All such similar substitutes and modifications apparent to those skilled in the art are deemed to be within the scope and concept of the disclosure. It is intended that the specification be considered exemplary only, with the scope and spirit of the disclosure being indicated by the claims which follow.

The invention claimed is:

1. A method of suppressing the generation of dust from particulates of sand at a wellsite comprising applying onto at least a portion of the surface of the sand particulates a polyionic material in accordance with at least one of the following:
    (a) during excavating of the sand particulates from a sand mine;
    (b) during the processing of evacuated sand from a sand mine;
    (c) during loading of the sand particulates from a sand mine onto a transport vehicle or into a storage receptacle;
    (d) during transloading of the sand particulates from a transport vehicle to another transport vehicle or a storage receptacle;
    (e) during transloading of the sand particulates from a storage receptacle to a transport vehicle or another storage receptacle;
    (f) after the sand particulates are unloaded from a transport vehicle into one or more storage receptacles but prior to loading the sand particulates into a blender at the wellsite; and
    (g) as the sand particulates are loaded into a blender at the wellsite and further wherein the particle size of the polyionic material and the sand particulates is substantially the same.

2. The method of claim 1, wherein the particle size of the polyionic material and the sand particulates is from about 50μ to about 2,000μ.

3. The method of claim 1, wherein the polyionic material is a polycationic polymer selected from the group consisting of:
    (a) a polyallylamine hydrochloride homo- or copolymer, salt or quaternized derivative, optionally comprising modifier units;
    (b) a polyethyleneimine, salt or quaternized derivative thereof;
    (c) a polyvinylamine homo- or copolymer, salt or quaternized derivative thereof optionally comprising modifier units;
    (d) a poly[vinylbenzyl-tri($C_1$-$C_4$ alkyl)ammonium salt] or a quaternized derivative thereof;
    (e) a polymer resulting from a step-wise polymerization (quaternization) reaction between a dihalide and N,N,N',Nt-tetra($C_1$-$C_4$ alkyl)-alkylenediamine;
    (f) a poly(vinylpyridine) or poly(vinylpyridinium salt) homo- or copolymer or a quaternized derivative thereof;
    (g) a polymer via ring-forming polymerization of N,N-diallyl-N,N-di(C1-C4 alkyl)ammonium halide, comprising units of the formula:

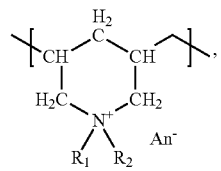

wherein $R_1$ and $R_2$ are each independently $C_1$-$C_4$ alkyl and $An^-$ is an anion;
(h) a homo- or copolymer of a quaternized di($C_1$-$C_4$ alkyl)aminoethyl acrylate or methacrylate;
a polyaminoamide (PAMAM), a salt or quaternized derivative thereof; and
(j) mixtures of any of (a) through (i).

4. A method of suppressing the generation of dust from particulates of sand at a wellsite comprising applying onto at least a portion of the surface of the sand particulates a polyionic material in accordance with at least one of the following:
(a) the polyionic material is applied onto a least a portion of the surface of the sand particulates at a sand mine while the sand particulates are being transferred onto a transport vehicle or into a storage receptacle;
(b) the polyionic material is applied onto at least a portion of the sand particulates as the sand particulates are transported onto a transport vehicle or into a storage receptacle on a moving conveyor;
(c) the polyionic material is applied onto at least a portion of the sand particulates during transloading of the sand particulates from a transport vehicle to another transport vehicle or a storage receptacle;
(d) the polyionic material is applied onto at least a portion of the sand particulates after the sand particulates are unloaded from a transport vehicle into one or more storage receptacles but prior to unloading the sand particulates into a blender at the wellsite; or
(e) the polyionic material is applied onto at least a portion of the sand particulates as the sand particulates are loaded into a blender at the wellsite.

5. The method of claim 4, wherein the polyionic material is a polycationic polymer.

6. The method of claim 5, wherein the polycationic polymer is selected from the group consisting of:
(a) a polyallylamine hydrochloride homo- or copolymer, salt or quaternized derivative, optionally comprising modifier units;
(b) a polyethyleneimine, salt or quaternized derivative thereof;
(c) a polyvinylamine homo- or copolymer, salt or quaternized derivative thereof optionally comprising modifier units;
(d) a poly[vinylbenzyl-tri($C_1$-$C_4$ alkyl)ammonium salt] or a quaternized derivative thereof;
(e) a polymer resulting from a step-wise polymerization (quaternization) reaction between a dihalide and N,N,N',N'-tetra($C_1$-$C_4$ alkyl)-alkylenediamine;
(f) a poly(vinylpyridine) or poly(vinylpyridinium salt) homo- or copolymer or a quaternized derivative thereof;
(g) a polymer via ring-forming polymerization of N,N-diallyl-N,N-di(C1-C4alky)ammonium halide, comprising units of the formula:

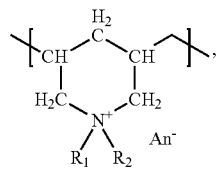

wherein $R_1$ and $R_2$ are each independently $C_1$-$C_4$ alkyl and $An^{31}$ is an anion;
(h) a homo- or copolymer of a quaternized di($C_1$-$C_4$ alkyl)aminoethyl acrylate or methacrylate;
(i) a polyaminoamide (PAMAM), a salt or quaternized derivative thereof; and
(j) mixtures of any of (a) through (i).

7. The method of claim 4, wherein the polyionic material is applied onto at least a portion of the sand particulates at the sand mine while the sand particulates are being transferred onto a transport vehicle or into a storage receptacle.

8. The method of claim 4, wherein the polyionic material is applied onto at least a portion of the sand particulates as the sand particulates are transported onto the transport vehicle or into a storage receptacle on a moving conveyor.

9. The method of claim 4, wherein the polyionic material is applied onto at least a portion of the sand particulates during transloading of the sand particulates from a transport vehicle to another transport vehicle or a storage receptacle.

10. The method of claim 9, wherein the polyionic material is applied onto at least a portion of the sand particulates during transloading of the sand particulates from a first transport vehicle to a second transport vehicle.

11. The method of claim 9, wherein the polyionic material is transported from the first transport vehicle on a conveyor to the second transport vehicle and further wherein the polyionic material is applied onto the sand particulates on the conveyor.

12. The method of claim 9, wherein the polyionic material is applied onto at least a portion of the sand particulates during transloading of the sand particulates from the transport vehicle to the storage receptacle.

13. The method of claim 12, wherein the sand particulates are transported from the first transport vehicle on a conveyor to the storage receptacle and further wherein the polyionic material is applied onto the surface of at least a portion of the sand particulates on the conveyor.

14. The method of claim 4, wherein the polyionic material is applied onto at least a portion of the sand particulates after the sand particulates are unloaded from a transport vehicle into one or more storage receptacles but prior to unloading the sand particulates into a blender at the wellsite.

15. The method of claim 14, wherein the polyionic material is applied onto the sand particulates as the polyionic material enters the storage receptacle.

16. The method of claim 15, wherein the storage receptacle has a spray bar and further wherein the polyionic material is sprayed through the spray bar onto the surface of at least a portion of the sand particulates.

17. The method of claim 14, wherein the sand particulates are unloaded from the storage receptacle onto a conveyor and wherein the polyionic material is applied onto the surface of at least a portion of the sand particulates on the conveyor.

18. The method of claim 17, wherein the conveyor extends underneath the storage receptacle.

19. The method of claim 4, wherein the polyionic material is applied onto at least a portion of the sand particulates as the sand particulates are loaded into a blender at the wellsite.

20. The method of claim 17, wherein the sand particulates are fed into the blender on a conveyor and further wherein the polyionic material is applied onto the surface of at least a portion of the sand particulates while the sand particulates are on the conveyor.

21. The method of claim 4, wherein the polyionic material is applied onto at least a portion of the particulates of sand through a spray nozzle or spray bar.

22. The method of claim 21, wherein the nozzle from which the polyionic material is sprayed onto at least a portion of the particulates of sand is stationary.

23. The method of claim 21, wherein the polyionic material is atomized as it is pumped through the spray nozzle or spray bar.

24. The method of claim 4, wherein the polyionic material is applied onto at least a portion of the sand particulates during unloading of the sand particulates into at least one storage receptacle.

25. A method of suppressing the generation of dust from sand at a wellsite comprising transporting particulates of sand from a mine and spray coating onto at least a portion of the surface of the sand particulates a polyionic material wherein application of the polyionic material onto the surface of the sand particulates occurs after the sand particulates are transported from the mine.

26. The method of claim 25, wherein the polyionic material is sprayed onto the surface of at least a portion of the sand particulates in a storage receptacle.

27. The method of claim 25, wherein the polyionic material is applied onto at least a portion of the surface of the sand particulates during transit of the excavated sand particulates from the sand mine to a processing facility.

28. The method of claim 25, wherein the excavated sand particulates are subjected to washing and are then dried and further wherein at least a portion of the surface of the washed sand particulates are treated with the polyionic material during transfer of the washed sand particulates to a dryer.

29. The method of claim 25, wherein the excavated sand particulates are sized in a sorter and wherein at least a portion of the surface of the excavated sand particulates are coated with the polyionic material prior to being introduced in the sorter, while in the sorter or after exiting the sorter.

30. The method of claim 25, wherein the excavated sand particulates are subjected to washing and then sized in a sorter and then transferred to a storage location and wherein at least a portion of the surface of the sized sand particulates are coated with the polyionic material prior to or during transfer to the storage location.

31. The method of claim 25, wherein the polyionic material is a polycationic polymer selected from the group consisting of:
(a) a polyallylamine hydrochloride homo- or copolymer, salt or quaternized derivative, optionally comprising modifier units;
(b) a polyethyleneimine, salt or quaternized derivative thereof;
(c) a polyvinylamine homo- or copolymer, salt or quaternized derivative thereof optionally comprising modifier units;
(d) a poly[vinylbenzyl-tri($C_1$-$C_4$ alkyl)ammonium salt] or a quaternized derivative thereof;
(e) a polymer resulting from a step-wise polymerization (quaternization) reaction between a dihalide and N,N,N',N'-tetra($C_1$-$C_4$ alkyl)-alkylenediamine;
(f) a poly(vinylpyridine) or poly(vinylpyridinium salt) homo- or copolymer or a quaternized derivative thereof;
(g) a polymer via ring-forming polymerization of N,N-diallyl-N,N-di(C1-C4alkyl)ammonium halide, comprising units of the formula:

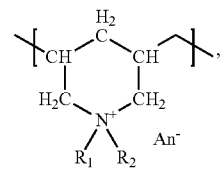

wherein $R_1$ and $R_2$ are each independently $C_1$-$C_2$ alkyl and $An^-$ is an anion;
(h) a homo- or copolymer of a quaternized di($C_1$-$C_4$ alkyl)aminoethyl acrylate or methacrylate;
(i) a polyaminoamide (PAMAM), a salt or quaternized derivative thereof; and
(j) mixtures of any of (a) through (i).

* * * * *